(12) United States Patent
Wei

(10) Patent No.: US 11,238,402 B2
(45) Date of Patent: *Feb. 1, 2022

(54) INFORMATION OPERATION

(71) Applicant: Advanced New Technologies Co., Ltd., Grand Cayman (KY)

(72) Inventor: Yongdong Wei, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 207 days.

This patent is subject to a terminal disclaimer.

(21) Appl. No.: 16/741,531

(22) Filed: Jan. 13, 2020

(65) Prior Publication Data

US 2020/0151656 A1    May 14, 2020

Related U.S. Application Data

(63) Continuation of application No. 14/818,132, filed on Aug. 4, 2015, now Pat. No. 10,579,960.

(30) Foreign Application Priority Data

Aug. 5, 2014    (CN) .......................... 201410381282.4

(51) Int. Cl.
| | | |
|---|---|---|
| *G06Q 10/08* | (2012.01) | |
| *G06F 16/23* | (2019.01) | |
| *G06F 16/955* | (2019.01) | |

(52) U.S. Cl.
CPC ........... *G06Q 10/087* (2013.01); *G06F 16/23* (2019.01); *G06F 16/9566* (2019.01)

(58) Field of Classification Search
None
See application file for complete search history.

(56) References Cited

U.S. PATENT DOCUMENTS

| 6,163,781 A | 12/2000 | Wess, Jr. |
|---|---|---|
| 6,934,767 B1 | 8/2005 | Jellinek |
| (Continued) | | |

FOREIGN PATENT DOCUMENTS

| CN | 101447872 A | 6/2009 |
|---|---|---|
| CN | 101674374 A | 3/2010 |
| (Continued) | | |

OTHER PUBLICATIONS

Translated Chinese Office Action dated Jan. 31, 2018 for Chinese patent application No. 2014103891282.4, a counterpart of foreign application of U.S. Appl. No. 14/818,132, 18 pages.

(Continued)

*Primary Examiner* — Paul Danneman
(74) *Attorney, Agent, or Firm* — Lee & Hayes, P.C.

(57) ABSTRACT

An information operation method and apparatus are described to solve the technical problem in the prior art of inconvenient, error-prone, and ineffective use of an identification number with a long length for communication and information operation. The techniques of the present disclosure generate a short identification number corresponding to an original identification number; store the short identification number and a corresponding relationship between the original identification number and the short identification number; upon a receipt of an operation request that includes the short identification number, search for the original identification number corresponding to the short identification number carried in the operation request; and perform an operation based on information corresponding to the found original identification number. The techniques of the present disclosure replace the original identification number with the generated short identification number for communication and information operation, which are convenient and less error-prone and enhance the operation efficiency.

20 Claims, 5 Drawing Sheets

(56) References Cited

U.S. PATENT DOCUMENTS

| | | | |
|---|---|---|---|
| 8,959,162 | B2 | 2/2015 | Bhogal et al. |
| 10,579,960 | B2* | 3/2020 | Wei ..................... G06Q 10/087 |
| 2002/0032677 | A1 | 3/2002 | Morgenthaler et al. |
| 2002/0111914 | A1 | 8/2002 | Terada et al. |
| 2004/0249883 | A1 | 12/2004 | Srinivasan et al. |
| 2007/0168560 | A1* | 7/2007 | Alkire ................... H04L 61/301 |
| | | | 709/247 |
| 2008/0194223 | A1 | 8/2008 | Overby |
| 2008/0313066 | A1 | 12/2008 | Sholtis et al. |
| 2010/0268739 | A1* | 10/2010 | Zalepa ................ G06F 16/9566 |
| | | | 707/782 |
| 2011/0125912 | A1 | 5/2011 | Dawson |
| 2012/0102045 | A1 | 4/2012 | Cucerzan et al. |
| 2012/0215859 | A1 | 8/2012 | Bhogal et al. |
| 2016/0042311 | A1 | 2/2016 | Wei |

FOREIGN PATENT DOCUMENTS

| | | |
|---|---|---|
| CN | 103530765 A | 1/2014 |
| JP | H1078928 A | 3/1998 |
| JP | 2004038439 A | 2/2004 |
| JP | 2007312226 A | 11/2007 |
| JP | 2011209861 A | 10/2011 |
| JP | 2012164184 A | 8/2012 |
| JP | 2013545333 A | 12/2013 |
| KR | 20040036681 A | 4/2004 |
| KR | 20120137629 A | 12/2012 |
| KR | 20130072907 A | 7/2013 |
| WO | WO2004110027 A1 | 12/2004 |

OTHER PUBLICATIONS

Translated Chinese Office Action dated Sep. 28, 2018 for Chinese patent application No. 2014103891282.4, a counterpart of foreign application of U.S. Appl. No. 14/818,132, 11 pages.
Chinese Search Report dated Jan. 5, 2018 for Chinese Patent Application No. 201410381282.4, 2 pages.
Supplemental Chinese Search Report dated Sep. 11, 2018 for Chinese Patent Application No. 201410381282.4, 2 pages.
Extended European Search Report dated Jan. 2, 2018 for European Patent Application No. 15830469.1, 5 pages.
Japanese Office Action dated Jul. 9, 2019 for Japanese Patent Application No. 2017-504345, a counterpart of U.S. Appl. No. 14/818,132, 7 pages.
Japanese Office Action dated Apr. 2, 2019 for Japanese Patent Application No. 2017-504345, a counterpart of U.S. Appl. No. 14/818,132, 8 pages.
Korean Office Action dated Aug. 16, 2019 for Korean Patent Application No. 2017-7002267, a counter part of U.S. Appl. No. 14/818,132, 10 pages.
Non Final Office Action dated Oct. 15, 2019 for U.S. Appl. No. 14/818,132 "Information Operation," Wei, 13 pages.
Office Action for U.S. Appl. No. 14/818,132, dated Nov. 14, 2017, Wei, "Information Operation," 14 pages.
Non Final Office Action dated Dec. 28, 2018 for U.S. Appl. No. 14/818,132 "Information Operation," Wei, 12 pages.
Office Action for U.S. Appl. No. 14/818,132, dated Apr. 26, 2019, Wei, "Information Operation," 11 pages.
Office Action for U.S. Appl. No. 14/818,132, dated May 4, 2018, Wei, "Information Operation," 16 pages.
PCT Search Report and Written Opinion dated Oct. 15, 2015 for PCT Application No. PCT/US15/43659, 12 pages.
"ShortGuid—A shorter and url friendly GUID class in C#," retrieved at <<https://www.singular.co.nz/2007/12/shortguid-a-shorter-andurl-friendly-guid-in-c-sharp/>> on Mar. 19, 2019, Dave Transom's CSharpVitamins, Dec. 20, 2007, 4 pages.
Wikipedia, "TinyURL," retrieved on Dec. 8, 2017 at <<https://en.wikipedia.org/w/index/php?title=TinyURL&oldid=619532538>>, 2 pages.
Japanese Office Action dated Dec. 15, 2020 for Japanese Patent Application No. 2017-504345, a counterpart foreign application of U.S. Pat. No. 10,579,960, 6 pages.
English Translation and the Korean Office Action dated Feb. 26, 2020 for Korean Patent Application No. 2017-7002267, a counterpart of U.S. Pat. No. 10,579,960, 4 pages.
Indian Office Action dated Sep. 17, 2020 for Indian Patent Application No. 201717003429, a counterpart of U.S. Pat. No. 10,579,960, 7 pages.
European Office Action dated Aug. 13, 2020 for European Patent Application No. 15830469.1, a counterpart of U.S. Pat. No. 10,579,960, 28 pages.

* cited by examiner

INFORMATION OPERATION

CROSS REFERENCE TO RELATED PATENT APPLICATION

This application is a continuation of and claims priority to U.S. patent application Ser. No. 14/818,132, filed on Aug. 4, 2015, the disclosure of which claims foreign priority to Chinese Patent Application No. 201410381282.4 filed on 5 Aug. 2014, entitled "INFORMATION OPERATION METHOD AND APPARATUS," which is hereby incorporated by reference in its entirety.

TECHNICAL FIELD

The present disclosure relates to the field of computer technology, and more particularly, to an information operation method and apparatus.

BACKGROUND

With the continuous development of computer and Internet technologies, a user usually performs an information operation by using a computing device such as a computer, and the operation on the information is usually carried out based on an identification number of the information to be processed.

However, along with the explosive growth of information, identification numbers for identifying various information have more and more digits, which are difficult for communication and information operation and error-prone, and have a low operation efficiency.

Using a product number used in an Internet product library as an example, in the prior art, for each product, a unique product number will be generated correspondingly, and when users want to perform an operation on the product information of the product, the product number is used for performing the operation, such as a query operation, on the corresponding product information.

However, due to the growing diversity of the categories and styles of products, the length of the product number is increasing and accumulating day by day, and has been extended to a very long length. Using a product number with such a length to perform an operation on the product information is very inconvenient and error-prone, and has low operation efficiency.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an information operation method and apparatus to solve the problem in the prior art relating to the ineffective use in an identification number with a long length for communication and information operation and such identification numbers being error prone.

The present disclosure provides an example information operation method, which may include generating a short identification number according to or corresponding to (hereinafter referred to as "corresponding to") an original identification number, the short identification number having fewer digits than the original identification number; storing the short identification number and a corresponding relationship between the original identification number and the short identification number; and upon the receipt of an operation request that carries the short identification number, searching for the original identification number corresponding to the short identification number carried in the operation request, and performing an operation based on information corresponding to the found original identification number.

The present disclosure also provides an example information operation apparatus, including: a generation module that generates a short identification number corresponding to an original identification number, the short identification number having fewer digits than the original identification number; a storing module that stores the short identification number and a corresponding relationship between the original identification number and the short identification number; and an operating module that, upon the receipt of an operation request that carries the short identification number, searches for the original identification number corresponding to the short identification number carried in the operation request, and performs an operation based on information corresponding to the found original identification number.

The present disclosure provides an information operation method and apparatus. For example, a server generates a short identification number corresponding to an original identification number, stores the short identification number and a corresponding relationship between the original identification number and the short identification number, upon the receipt of an operation request that carries the short identification number, searches for the original identification number corresponding to the short identification number carried in the operation request, and performs an operation based on information corresponding to the found original identification number. Through the above method, since the short identification number has fewer digits than the original identification number, by replacing the original identification number with the generated short identification number for the communication and information operation, the techniques of the present disclosure make the information operation convenient and less error-prone, and enhance the efficiency of information operation effectively.

BRIEF DESCRIPTION OF THE DRAWINGS

The drawings described herein are used for providing a further understanding of the present disclosure, and constitute a part of the present disclosure. The illustrative embodiments of the present disclosure and the description thereof are used for illustrating the present disclosure and are not intended to limit the present disclosure. In the drawings.

DETAILED DESCRIPTION

To make the objectives, technical solutions, and advantages of the embodiments of the present disclosure more comprehensible, the technical solutions of the present disclosure are described in the following with reference to the example embodiments and accompanying Figures of the present disclosure. Apparently, the described example embodiments represent merely a part and not all of the embodiments of the present disclosure. All other embodiments obtained by persons of ordinary skill in the art without using creative efforts shall belong to the protection scope of the present disclosure.

Figure 1:
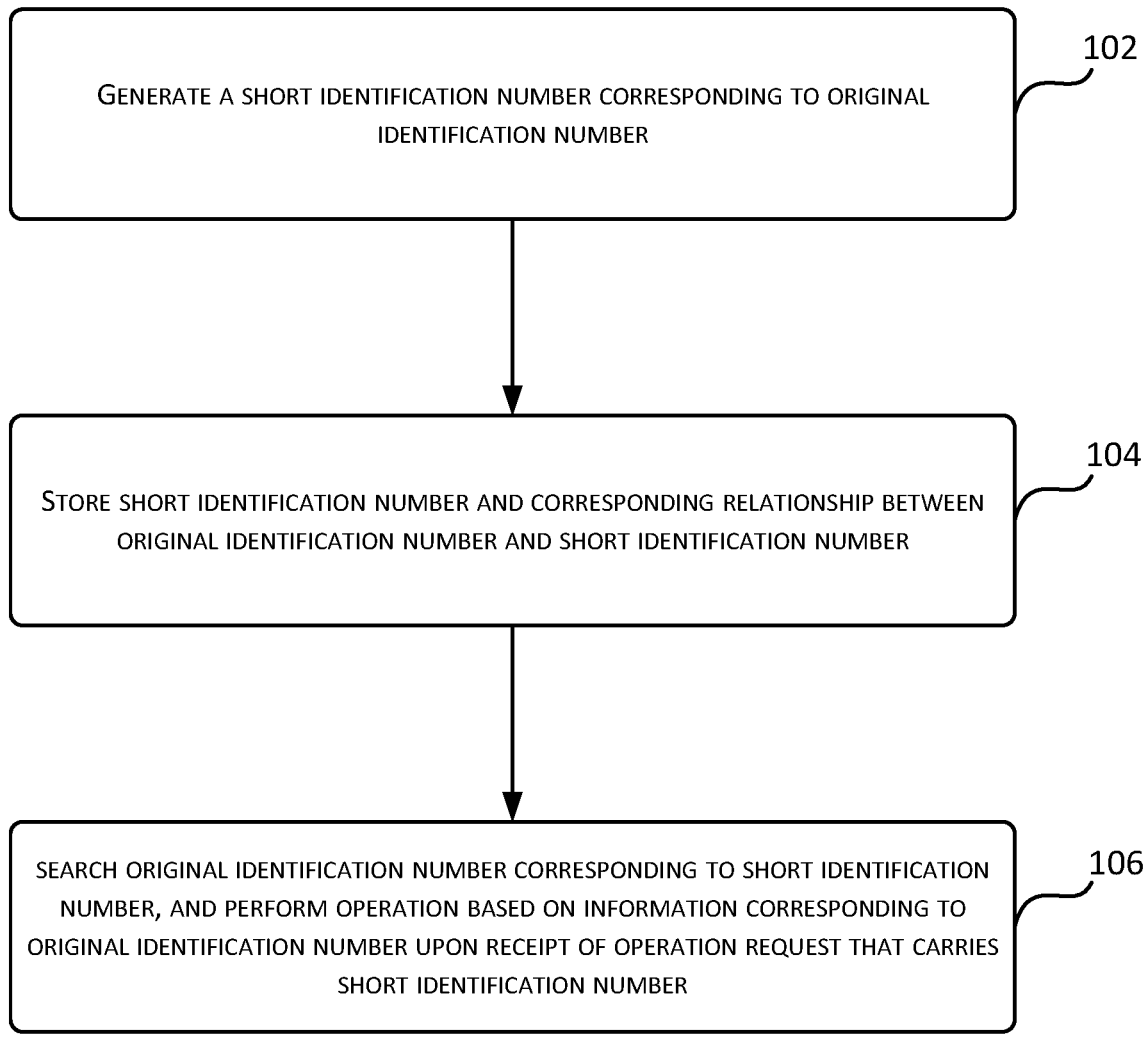
FIG. 1 is a process of an example information operation according to an example embodiment of the present disclosure.

FIG. 1 is a process of an example information operation according to an example embodiment of the present disclosure, which includes the following operations.

At 102, a short identification number is generated corresponding to an original identification number.

In an example embodiment of the present disclosure, the original identification number may be an identification number corresponding to any information, for example, an identification number with many digits, such as a product number, an order number, and a transaction number. The original identification number is generally composed of numbers, letters, or a combination of the numbers and letters. When users have permission to operate on certain information, the users, by using the original identification number corresponding to such information, may perform the operation on corresponding detailed information, such as querying the detailed product information by using the product number, querying the detailed order information by using the order number, and querying the detailed transaction information by using the transaction number.

When the server receives a request for generating a short identification number for an original identification number, the short identification number is generated corresponding to the original identification number, wherein the generated short identification number has fewer digits than the original identification number. For example, provided that the original identification number is 28-digit, the generated short identification number may be 4-digit.

For example, when a user needs to generate the short identification number for the original identification number, the user may send a request for generating a short identification number to the server, the request carrying the original identification number, and the server receives the request for generating a short identification number and generates the short identification number based on a preset rule.

For example, considering that the generated short identification number should be a unique short identification number corresponding to the original identification number, after generating the short identification number based on the preset rule, the server will query the short identification number that is stored in the server and corresponding to each original identification number, and determine whether the generated short identification number exists. If the generated short identification number exists, the server re-generates the short identification number based on the preset rule until when the generated short identification number does not exist in the stored short identification number corresponding to each original identification number. The server uses the generated short identification number as the short identification number generated corresponding to the original identification number. If the generated short identification number does not exist, the server uses the short identification number generated based on the preset rule as the short identification number generated corresponding to the original identification number.

For example, generating the short identification number based on the preset rule may include the following operation. In a preset value range, a short identification number is generated at random. That is, when generating the short identification number, the server may select a value in the preset value range of the short identification number as the generated short identification number.

For another example, the server may also generate the short identification number in accordance with other rules. Generally, the preset rule includes two steps: the first step is to preset a range of the short identification number, for example, to preset the short identification number to be 4-digit with each digit being in a value range of 0-9, A-Z, etc.; and the second step is to preset a selection method for selecting a value in the range as the generated short identification number, such as a random selection, a sequential selection, etc.

For instance, the rule preset by the server is as follows: the short identification number is 4-digits with each digit being in a value range of 0-9, the selectable short identification number includes all integers starting from 0000, and the selection method for selecting the value is a sequential selection mode. The process of generating the short identification number is as follows: firstly 0000 is selected as the generated short identification number, and then there is a query whether the short identification number 0000 has been used. That is, in the stored corresponding relationship, whether the short identification number 0000 corresponding to a certain original identification number already exists. If so, the next short identification number 0001 is sequentially selected as the generated short identification number. If the short identification number 0001 does not correspond to a certain original identification number in the stored corresponding relationship, the short identification number 0001 will be used as the generated short identification number corresponding to the original identification number. Otherwise, the next short identification number 0002 will be tried until the short identification number is successfully generated.

In the example embodiment of the present disclosure, the server may be a server for a shopping platform, such as an order placing server and/or a payment server for E-commerce, or a server for other information systems, such as a server for a book borrowing platform of a library. The request for generating a short identification number may be initiated by the user through an application installed on a terminal device. For example, the terminal device may be a computer, a TV, or a mobile device such as a mobile phone or a tablet. For example, when identifying the detailed information of each transaction by using a transaction number on a certain payment platform, the users may send the request for generating a short identification number according to the current transaction number to the payment server through an application installed on the mobile phone.

At 104, the short identification number and a corresponding relationship between the original identification number and the short identification number are stored.

The server stores the short identification number and the corresponding relationship between the original identification number and the short identification number. According to the corresponding relationship, the corresponding original identification number is found through the short identification number, and the corresponding short identification number is found through the original identification number.

Generally, the original identification number and the generated short identification number are in a one-to-one corresponding relationship. However, in the case of a practical application scenario, the users may need to query multiple different pieces of information at the same time. For example, after purchasing multiple commodities on an E-commerce shopping platform on the same day, the user may need to query the detailed information of the multiple orders at the same time. At this point, generating a short identification number for each order number respectively is not only a resource waste of the short identification number but also has low query efficiency. Therefore, in the example embodiments of the application, under such a scenario, a common short identification number is generated for multiple order numbers of a same user, and the detailed information of these orders are queried by using the short identification number. In other words, under such a scenario, a request for generating a short identification number may carry multiple original identification numbers, and upon the receipt of the request that carries the multiple original identification numbers, the server may generate only one short identification number, and establish a corresponding relationship between the short identification number and the multiple original identification numbers carried in the request. That is, the multiple original identification numbers carried in the request correspond to the same short identification number, and the short identification number will not be regarded as a repetitive short identification number.

At 106, upon the receipt of an operation request that carries the short identification number, the original identification number corresponding to the short identification number is searched, and an operation is performed on information corresponding to the original identification number.

In the example embodiment of the present disclosure, the operation request may be initiated from the terminal device by the users or initiated on the server by a service provider. For example, a customer service or background management staff of the service provider directly operates on the server.

Upon the receipt of the operation request that includes the short identification number, according to the short identification number included in the operation request, the server may query the original identification number corresponding to the short identification number included in the operation request from the stored corresponding relationship between the original identification number and the generated short identification number, search for the relevant information based on the original identification number, and finally perform an operation on the found relevant information according to the operation request. For example, the relevant information may be the detailed information corresponding to the original identification number, such as detailed product information, detailed order information, and detailed transaction information.

Through the above operations, the corresponding short identification number is generated corresponding to the original identification number. Since the short identification number has fewer digits than the original identification number, by replacing the original identification number with the short identification number for communication and information operation, the techniques of the present disclosure provide convenience for the user and the service provider and are less error-prone, and improve the efficiency of information operation effectively.

Furthermore, if the server stores the generated short identification number indefinitely, with the increase of the quantity of the original identification number, the digits of the generated short identification number will increase (in order to have sufficient short identification numbers corresponding to the continuously increasing original identification numbers). After a certain period of time, even the use of the short identification number will no longer be convenient. Therefore, in the example embodiments of the present disclosure, after the generation of the short identification number, the server may set an expiration time for the short identification number. When a time length of a short identification number stored by the server exceeds the expiration time preset for the short identification number, the server deletes the short identification number and the corresponding relationship between the short identification number and the original identification number.

Still using the transaction number as the original identification number as the example, in the practical application scenario, the expiration time of the short identification number may be set according to the transaction volume and the digits of the short identification number. Provided that the server is preset to use a 4-digit short identification number with each digit being in a value range of 0-9, the transaction volume shall not exceed 10000 before the expiration time. Provided that the transaction volume is 5000-9999 in 1 minute, it is appropriate to set the expiration time of the short identification number to be 1 minute.

For another example, the expiration time of the short identification number may not be set to have a short expiration, and in some application scenarios, it is necessary to set a longer expiration time for the short identification number. For instance, the user places an order or makes a reservation on a group purchase website (at this point, the server generates a corresponding order number), and the short identification number generated according to the order number will be used only when the users make a purchase in the shop after a period of time. In such scenario, the short identification number should have a longer expiration time.

In addition, after the server deletes the short identification number and the corresponding relationship between the short identification number and the original identification number, such a short identification number may be used as a short identification number corresponding to another original identification numbers. The user may still request to generate a short identification number for the original identification number.

Furthermore, in the example embodiment of the present disclosure, the operation request includes a query request and the process of performing an operation on the information corresponding to the found original identification number may include querying the corresponding information by using the found original identification number.

Figure 2:
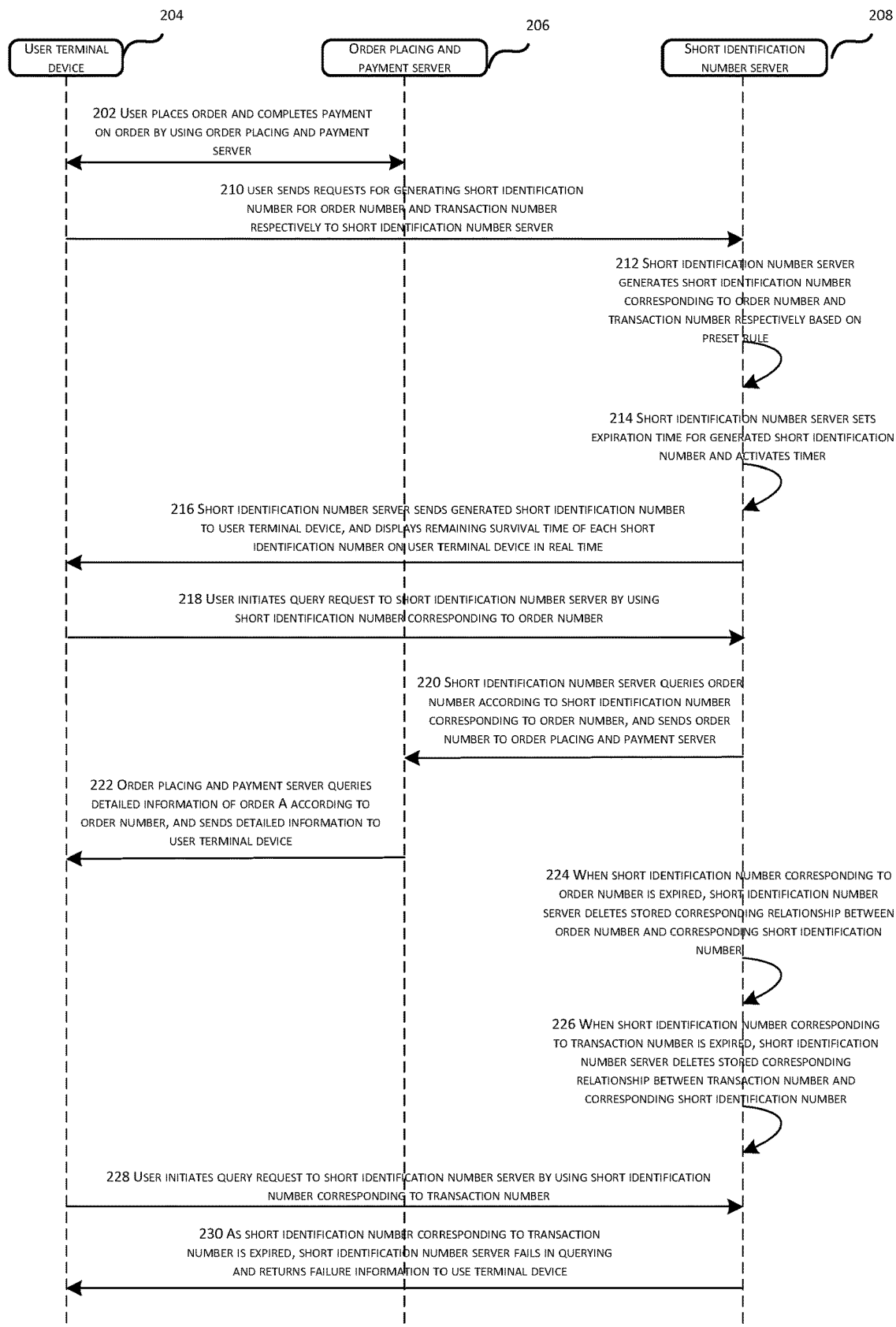
FIG. 2 is a process of an example information operation in a practical application scenario according to an example embodiment of the present disclosure.
Figure 3:
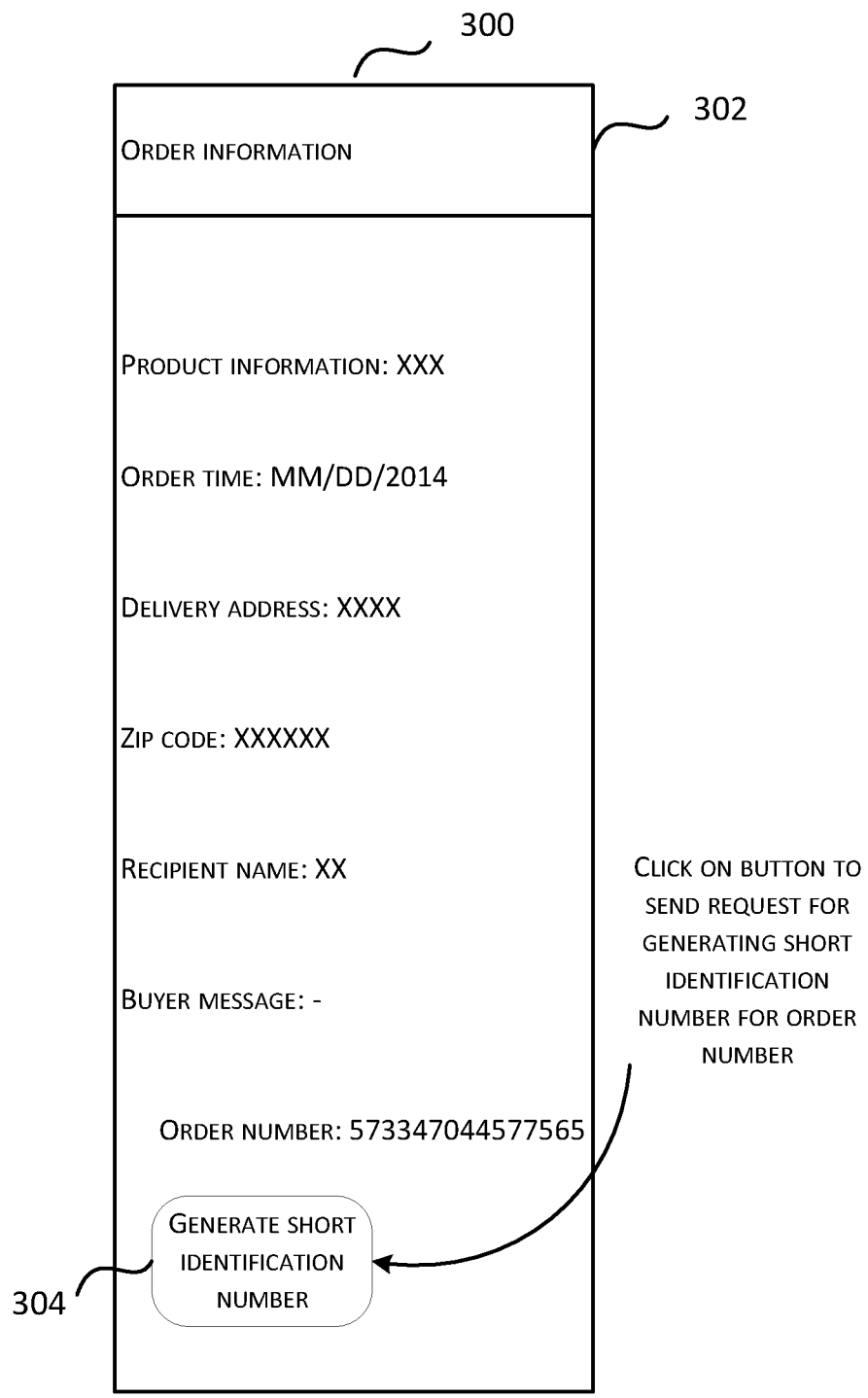
FIG. 3 is an example order information page displayed on a user terminal before a short identification number is generated under the practical application scenario according to an example embodiment of the present disclosure.
Figure 4:
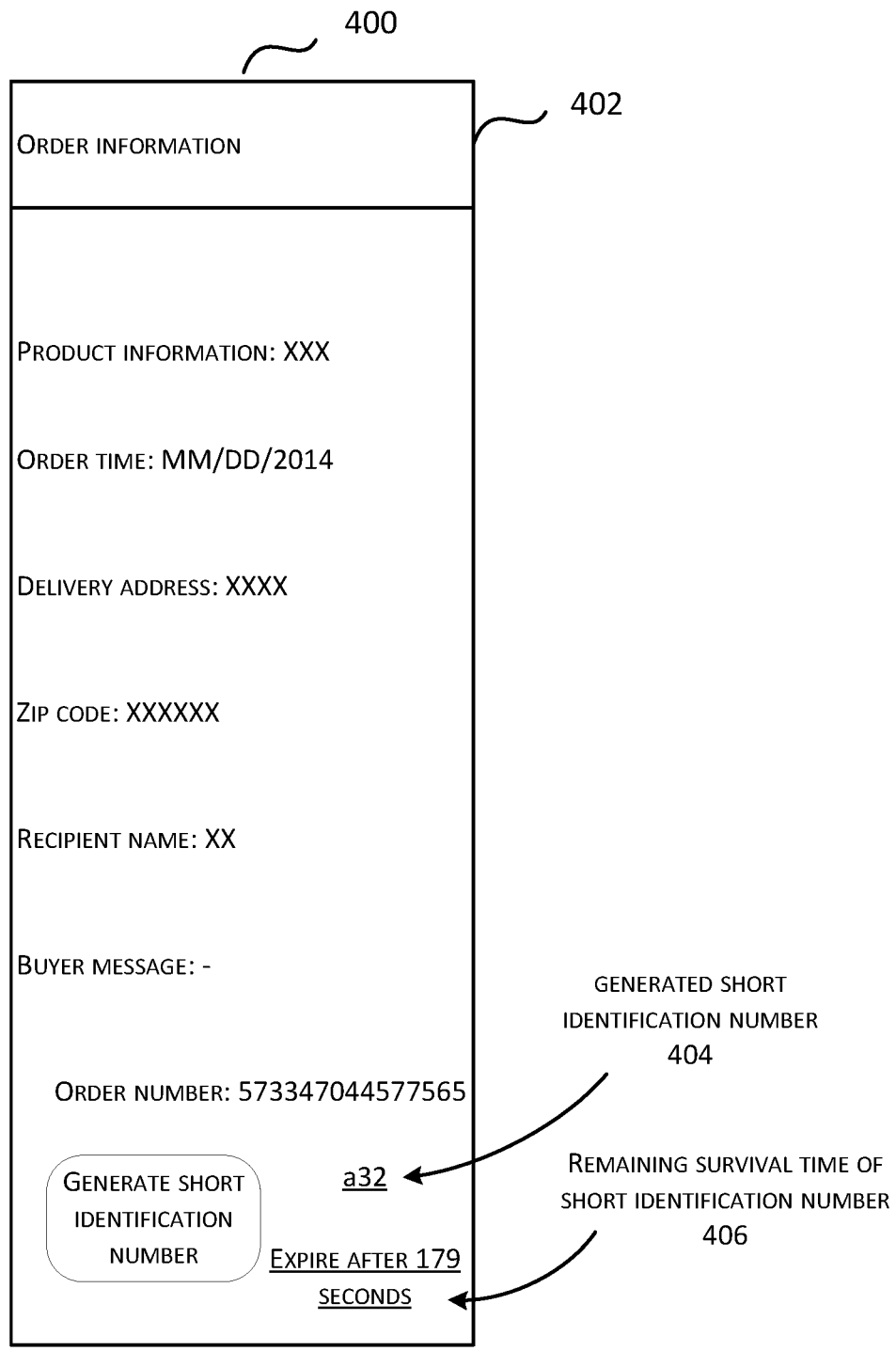
FIG. 4 is an example order information page displayed on the user terminal after a short identification number is generated under the practical application scenario according to an example embodiment of the present disclosure.

With reference to FIGS. 2-4, the information operation method according to the example embodiment of the present disclosure will be described in an example that the user places an order on a shopping platform to purchase commodities and completes the payment operation on a payment platform.

If the user uses a computer to place an order on the shopping platform and completes the order payment on the payment platform, the server used by the shopping platform and the payment platform is collectively referred to as an order placing and payment server, and the users complete the order placing operation and the order payment operation by using such order placing and payment server. A server that generates the short identification number corresponding to the original identification number is referred to as a short identification number server.

Provided that the range and generation rule of the short identification number are preset and stored in the short identification number server, the preset range and generation rules may be as follows:

The original identification number of the shopping platform is a 15-digit order number, and the short identification number generated for the order number is 3-digits with each digit being in a value range of 0-9 and a-z, such as a32, and the selection method for selecting a value in such a range is a random selection.

The original identification number of the payment platform is a 28-digit transaction number, and the short identification number generated for the transaction number is 4-digits with each digit being in a value range of 0-9, such as 0169, and the selection method for selecting a value in such range is an ascending sequential selection.

FIG. 2 is a process of an example information operation in a practical application scenario according to an example embodiment of the present disclosure.

At 202, a user, by using a user terminal device 204, places an order and completes a payment on the order through an order placing and payment server 206.

After the user place an order A, an order number corresponding to the order is available in the order information. Provided that the order number of the order A is: 573347044577565, in addition to the order number, the order information further includes product information, delivery address, buyer message, etc. Then, the user make a payment for the order A, and a transaction number that identifies such payment operation is available in the transaction information. It is assumed that the transaction number corresponding to the order A is 20140317110010010400040725464.

Before the generation of the short identification number, the order information page displayed on the user terminal is as shown at a user interface 300 of the user terminal device 204 in FIG. 3, from which an order information page 302 includes the detailed information of the order, such as the product information, order time, delivery address, zip code, recipient name, buyer message, order number, etc. On the bottom left corner of the page, there is a button 304 "generate short identification number", and a click on this button will send a request for generating a short identification number for the order number corresponding to the order to a short identification number server 208.

Likewise, the user may also send a request for generating a short identification number for the transaction number of the order A to the short identification number server 208.

At 210, the user sends a request for generating a short identification number for the order number and the transaction number respectively to the short identification number server 208.

The request for generating a short identification number for the order number carries the order number, and the request for generating a short identification number for the transaction number carries the transaction number.

At 212, the short identification number server 208 generates the short identification number corresponding to the order number and the transaction number respectively based on a preset rule.

For example, with respect to the order number, the preset rule is to generate a 3-digit short identification number (with each digit being in a value range of 0-9 and a-z), and the selection method for selecting the value is a random selection. The short identification number randomly generated for the order number is a32, and the short identification number server 208 searches whether a32 already exists in the stored corresponding relationship between the order number and the short identification number, and if not, the short identification number server 208 will use a32 as the short identification number generated according to the order number.

For example, with respect to the transaction number, the preset rule is to generate a 4-digit short identification number (with each digit being in a value range of 0-9), and the selection method for selecting the value is an ascending sequential selection. The short identification number sequentially generated for the transaction number is 0000 and the short identification number server 208 searches whether the short identification number 0000 already exists in the stored corresponding relationship between the transaction number and the short identification number. If it does exist, the short identification number server 208 re-generates another short identification number sequentially until when such re-generated short identification number does not exist in the stored corresponding relationship. For instance, when the generated short identification number is 0169 which does not exist in the stored corresponding relationship between the transaction number and the short identification number, the short identification number server 208 uses 0169 as the short identification number generated according to the transaction number.

For example, if generating the short identification number sequentially, in order to avoid generating the short identification number from the smallest number and then traversing from the smallest number each time, which is time consuming, a forward circle search may proceed starting from the last successfully generated short identification number sequentially.

At 214, the short identification number server 208 sets an expiration time for the generated short identification number and activates a timer.

For example, the expiration time may be set either consistently for all generated short identification numbers or individually for each short identification number. In the example application scenario, provided that the expiration time of all of the generated short identification numbers is set to 3 minutes, i.e. 180 seconds, the short identification number server 208 activates a 180-second timer after the generation of the short identification number corresponding to the order number, and activates another 180-second timer after the generation of the short identification number corresponding to the transaction number.

At 216, the short identification number server 208 sends the generated short identification number to the user terminal device 204. The short identification sever 208 may display a remaining survival time of each short identification number at a user interface of the user terminal in real time.

The survival time of the generated short identification number is the existence time of the generated short identification number, so that the maximum survival time of the generated short identification number is the expiration time of the short identification number, and the remaining survival time of the generated short identification number is the expiration time of the short identification number minus the existence time of the short identification number.

After the generation of the short identification number, an order information page 402 displayed on a user interface 400 of the user terminal device 204 is shown in FIG. 4. Two pieces of information are added on the bottom right corner. Upper information 404 is the generated short identification number corresponding to the order number of the order A, while lower information 406 is the current remaining survival time of the short identification number displayed in real time.

At 218, the user initiates a query request to the short identification number server 208 through the user terminal device 204 by using the short identification number corresponding to the order number.

The users may initiate the query request to the short identification number server 208 directly, or notifies the service provider, such as the customer service of the service provider, of the short identification number, and then the customer service initiates the query request to the short identification number server 208.

At 220, the short identification number server 208 queries the order number according to the short identification number corresponding to the order number, and sends the order number to the order placing and payment server.

At 222, the order placing and payment server 206 queries detailed information of the order A according to the order number, and sends the detailed information to the user terminal device 204.

Provided that the short identification number server 208 generates a short identification number corresponding to the order number of the order A at 18:10:00, and the users initiate a query request to the short identification number server 208 through the user terminal device 204 by using the short identification number corresponding to the order number at 18:12:00. At this point the survival time of the short identification number a32 is 120 seconds which does not exceed the expiration time of 180 seconds. Thus, the short identification number server 208 still stores the short identification number a32 and the corresponding relationship between the short identification number a32 and the corresponding order number so that the short identification number server 208 may query the order number corresponding to the short identification number a32 according to the short identification number a32, and send the order number to the order placing and payment server 206. The order placing and payment server 206 may query the detailed information of the order A according to the order number, and send the detailed information to the user terminal.

At 224, when the short identification number corresponding to the order number is expired, the short identification number server 208 deletes the stored corresponding relationship between the order number and the corresponding short identification number.

Since the short identification number server 208 generates the short identification number corresponding to the order number of the order A at 18:10:00, the short identification number corresponding to the order number is expired at 18:13:00, and the short identification number server 208 deletes the stored corresponding relationship between the order number and the short identification number a32.

At 226, when the short identification number corresponding to the transaction number is expired, the short identification number server 208 deletes the stored corresponding relationship between the transaction number and the corresponding short identification number.

Provided that the short identification number server 208 generates a short identification number 0169 corresponding to the transaction number of the user's payment on the order A at 18:10:30, at 18:13:30, the short identification number corresponding to the transaction number will be expired and the short identification number server 208 will delete the stored corresponding relationship between the transaction number and the short identification number 0169.

At 228, the user initiates a query request to the short identification number server 208 through the user terminal device 204 by using the short identification number corresponding to the transaction number.

At 230, the short identification number server 208 fails in querying and returns failure information to the user through the user terminal device 204 as the short identification number corresponding to the transaction number is expired.

Provided that the user initiates a query request to the short identification number server 208 by using the short identification number 0169 at 18:15:00, since at this point, the survival time of the short identification number 0169 has exceeded the expiration time, i.e., the short identification number server 208 has deleted the short identification number 0169 and the corresponding relationship between the short identification number 0169 and the corresponding transaction number, the short identification number server 208 cannot query the short identification number 0169 and the corresponding transaction number. Thus, the short identification number server 208 fails in querying, and returns failure information to the user.

After the short identification number is expired, with respect to the order information, the user terminal device 204 will display the order information as shown in FIG. 3, and at this point, the user may click on the button for generating a short identification number again to send the request for generating a short identification number for the order number of the order A to the short identification number server 208 once again.

For example, in addition to the computer, the user terminal device 204 may be a mobile device such as a mobile phone and a tablet, and the process of the information operation provided in the embodiments of the present disclosure may also be implemented through corresponding applications on such mobile device.

For example, in the process as shown in FIG. 2, the sequence for the short identification number server 208 to generate the short identification number corresponding to the order number and the short identification number corresponding to the transaction number depends on the sequence for the user to send a request for generating a short identification number for the order number and a request for generating a short identification number for the transaction number.

The foregoing is described using a shopping platform as an example, a payment platform, and an operation request which is a query request. Certainly, in the example embodiment of the present disclosure, the operation request may also be other types of operation request, for example, a generation request for generating a Uniform Resource Locator (URL) and a link request for linking to corresponding information through a URL.

When the operation request is a generation request for generating a URL, the operation performed by the server on the information corresponding to the searched original identification number may include the following operations. A URL including the original identification number is generated as the URL of the information corresponding to the original identification number, and a URL including the short identification number is generated and provided to the users.

When the operation request is a link request for linking to corresponding information through the URL, the link request carries the URL. The operation performed by the server on the information corresponding to the found original identification number may include the following operations. The short identification number included in the URL carried in the link request is replaced with the found original identification number, and the relevant information is linked through the replaced URL.

The following example embodiment describes an example method for generating the URL according to the short identification number and using the URL to link to relevant information.

In a practical application scenario, provided that a seller needs to post product information of a to-be-sold product, a URL linking to such product information is generally generated through the server of the E-commerce website. The URL generally including a product number of the product and the product information of the product is linked through the URL including the product number.

In general, when promoting the product online such as through a microblog, the seller will add a web page link in the microblog so that the user clicks the web page link in the microblog directly and view the information of the product. However, since only a limited number of words are allowed in the microblog, if the web page link includes an overlong product code, the web page link may not be completely added into the microblog, so that the user cannot link to the correct web page.

However, in the information operation method provided by the present disclosure, the operation request may be a generation request for generating a URL. That is, provided that the server of the E-commerce website has generated a short identification number corresponding to the product number according to a product number of a product, the seller, when trying to post the product information of the product on the microblog, may firstly send the generation request for generating the URL according to the product number to the server. The server, upon the receipt of the generation request, generates the URL including the product number as the URL of the product information corresponding to the product number (i.e., the product information is linked through the URL including the product number). Then, the server generates the URL including the short identification number corresponding to the product number and provides it to the user.

Since the short identification number has fewer digits than the original product number, the URL including the short identification number is completely displayed at the microblog.

Accordingly, when other users click at the URL including the short identification number, an Internet Protocol (IP) address of the server of the E-commerce website is acquired through the service provided by a Domain Name System (DNS). Then, the users initiate a link request to the server according to the IP address, wherein the link request carries the URL including the short identification number. The server, upon the receipt of the link request, may search for the corresponding product number according to the short identification number included in the URL in the link request, replace the short identification number included in the URL carried in the link request with the found the product number, and then link to the product information corresponding to the product number through the replaced URL.

The foregoing is the information operation method provided by the example embodiments of the present disclosure. Based on the same or similar concepts, the present disclosure further provides an example information operation apparatus, as shown in FIG. 5.

Figure 5:
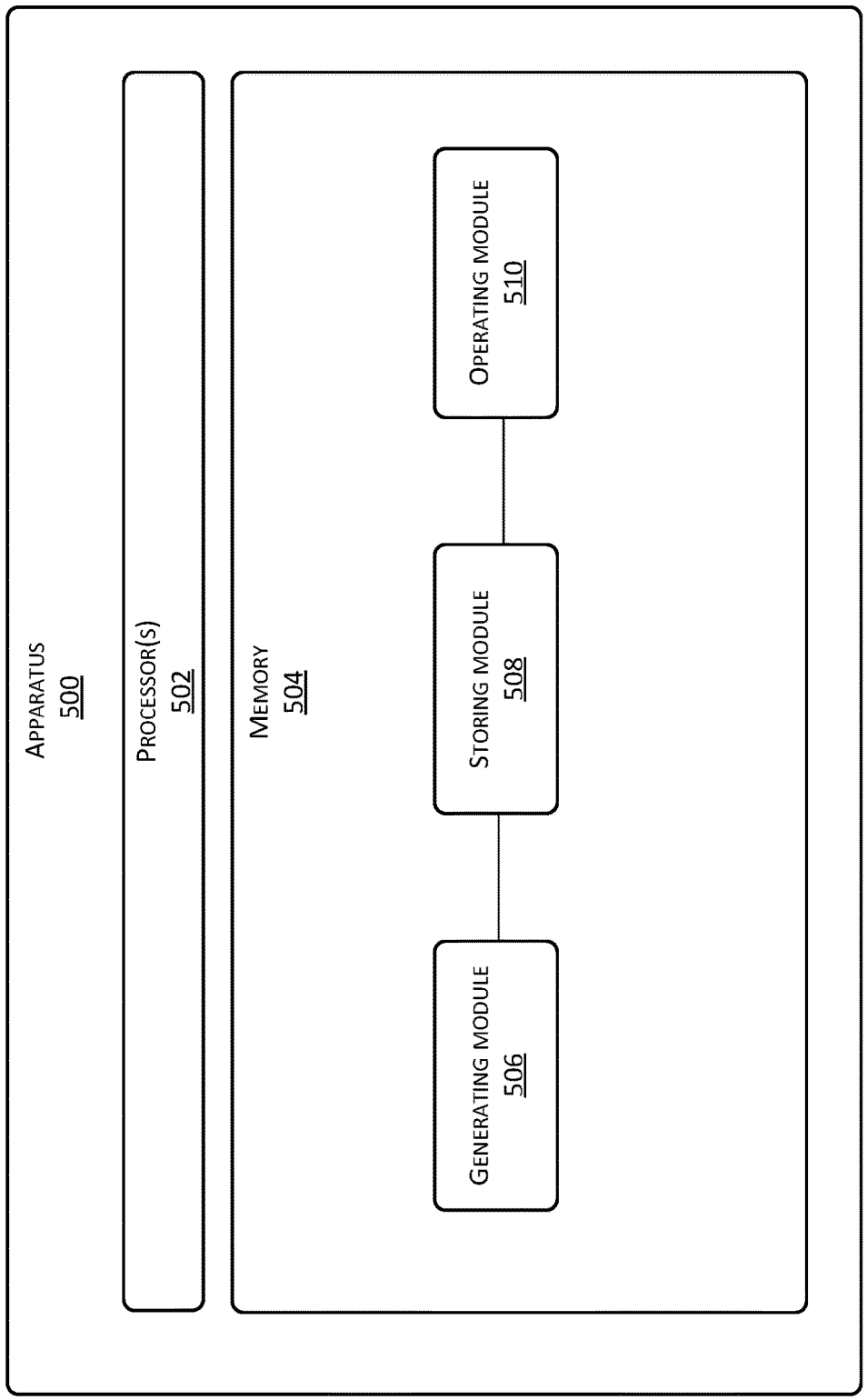
FIG. 5 is a structural diagram of an example information operation apparatus according to an example embodiment of the present disclosure.

FIG. 5 is a structural diagram of an example apparatus 500 for information operation according to an example embodiment of the present disclosure.

The apparatus 500 may include one or more processor(s) 502 or data processing unit(s) and memory 504. The apparatus 500 may further include one or more input/output apparatuses and network interfaces (not shown in FIG. 5). The memory 504 is an example of computer-readable media.

The memory 504 may store therein a plurality of modules or units including a generating module 506, a storing module 508, and an operating module 510.

The generation module 506 generates a short identification number corresponding to an original identification number, the short identification number having fewer digits than the original identification number.

The storing module 508 stores the short identification number and a corresponding relationship between the original identification number and the short identification number.

The operating module 510, upon the receipt of an operation request that includes the short identification number, searches for the original identification number corresponding to the short identification number carried in the operation request, and performs an operation based on information corresponding to the searched original identification number.

For example, the generation module 506 may receive a request for generating a short identification number, generate the short identification number based on a preset rule, and, according to the stored short identification number corresponding to each original identification number, determine whether the generated short identification number exists. If the generated short identification number exists, the generating module 506 re-generates the short identification number at random based on the preset rule until when the generated short identification number does not exist in the stored short identification numbers corresponding to each original identification number, and uses the generated short identification number as the short identification number generated corresponding to the original identification number. Otherwise, the generating module 506 uses the short identification number generated based on the preset rule as the short identification number generated corresponding to the original identification number.

The generation module 506 may, in a preset value range, generate a short identification number at random.

For example, the storing module 508, when a time length of storing the short identification number exceeds a preset expiration time for the short identification number, deletes the short identification number and the corresponding relationship between the short identification number and the original identification number.

For example, the operation request includes a query request. The operating module 510 queries corresponding information by using the found original identification number.

For example, the operation request includes a generating request for generating a Uniform Resource Locator (URL). The operating module 510 generates a URL including the original identification number as a URL of the information corresponding to the original identification number, and generates a URL including the short identification number and provides it to users.

For example, the operation request includes a link request, wherein the link request carries the URL. The operating module 510 replaces the short identification number included in the URL carried in the link request with the found original identification number, and links to relevant information through the replaced URL.

For example, the original identification number includes a product number, a transaction number, and an order number.

For example, the apparatus as shown in FIG. 5 may be located on the server.

The present disclosure provide an information operation method and apparatus, in which the server generates a short identification number corresponding to an original identification number, stores the short identification number and a corresponding relationship between the original identification number and the short identification number, upon the receipt of an operation request that carries the short identification number, searches for the original identification number corresponding to the short identification number carried in the operation request, and performs operation based on information corresponding to the searched original identification number. Through the above operations, the original identification number is replaced with the generated short identification number for communication and information operation, which is convenient and less error-prone and enhances the operation efficiency effectively.

One of ordinary skill in the art should understand that the embodiments of the present disclosure may be methods, systems, or the programming products of computers. Therefore, the present disclosure may be implemented by hardware, software, or in combination of both. In addition, the present disclosure may be in a form of one or more computer programs containing the computer-executable instructions which may be implemented in the computer-readable medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram may be implemented by computer program instructions. These computer program instructions may be provided to the general computers, specific computers, embedded processor or other programmable data processors to generate a machine, so that a device of implementing one or more flows of the flow chart and/or one or more blocks of the block diagram may be generated through the instructions operated by a computer or other programmable data processors.

These computer program instructions may also be stored in other computer-readable media which may instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions may also be loaded in a computer or other programmable data processors, so that the computer or other programmable data processors may operate a series of operation steps to generate the process implemented by a computer. Accordingly, the instructions operated in the computer or other programmable data processors may provide the steps for implementing the functions specified in one or more flows of the flow chart and/or one or more blocks of the block diagram.

In a standard configuration, a computing device, such as the server, the user terminal device, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method implemented by one or more computing devices, the method comprising:
   generating a short identification number corresponding to an original identification number for enhancing operation efficiency for processing the original identification number, the short identification number having fewer digits than the original identification number;
   setting a preset expiration time for the short identification number based at least in part on digits of the short identification number or a frequency of use of the short identification number;
   sending the short identification number to a user terminal;
   searching for the original identification number corresponding to the short identification number in response to receiving an operation request that includes the short identification number from the user terminal; and performing an operation based on information corresponding to the original identification number.

2. The method of claim 1, wherein the operation request comprises a query request, and performing the operation based on the information corresponding to the original identification number comprises using the original identification number to search for the information.

3. The method of claim 1, wherein the operation request comprises a generation request for generating a Uniform Resource Locator (URL), and performing the operation based on the information corresponding to the original identification number comprises:
    generating a URL indicating the short identification number; and
    providing the URL indicating the short identification number to the user terminal.

4. The method of claim 1, wherein the operation request comprises a link request that carries a Uniform Resource Locator (URL), and performing the operation based on the information corresponding to the original identification number comprises:
    replacing the short identification number indicated by the URL with the original identification number; and
    linking to relevant information through the replaced URL.

5. The method of claim 1, wherein generating the short identification number corresponding to the original identification number comprises:
    receiving a request for generating the short identification number; and
    generating the short identification number based on a preset rule.

6. The method of claim 5, further comprising:
    determining that the generated short identification number exists in stored short identification numbers corresponding to each original identification number; and
    re-generating another short identification number based on the preset rule until when the re-generated short identification number does not exist in the stored short identification numbers corresponding to each original identification number.

7. The method of claim 5, further comprising:
    determining that the generated short identification number does not exist in stored short identification numbers corresponding to each original identification number; and
    using the generated short identification number as the short identification number corresponding to the original identification number.

8. The method of claim 5, wherein generating the short identification number based on the preset rule comprises generating the short identification number in a preset value range.

9. The method of claim 1, wherein the original identification number comprises: a product number, a transaction number, or an order number.

10. One or more computer readable media storing executable instructions that, when executed by one or more processors, cause the one or more processors to perform acts comprising:
    generating a short identification number corresponding to an original identification number for enhancing operation efficiency for processing the original identification number, the short identification number having fewer digits than the original identification number;
    setting a preset expiration time for the short identification number based at least in part on digits of the short identification number or a frequency of use of the short identification number;
    sending the short identification number to a user terminal;
    searching for the original identification number corresponding to the short identification number in response to receiving an operation request that includes the short identification number from the user terminal; and
    performing an operation based on information corresponding to the original identification number.

11. The one or more computer readable media of claim 10, wherein the operation request comprises a query request, and performing the operation based on the information corresponding to the original identification number comprises using the original identification number to search for the information.

12. The one or more computer readable media of claim 10, wherein the operation request comprises a generation request for generating a Uniform Resource Locator (URL), and performing the operation based on the information corresponding to the original identification number comprises:
    generating a URL indicating the short identification number; and
    providing the URL indicating the short identification number to the user terminal.

13. The one or more computer readable media of claim 10, wherein the operation request comprises a link request that carries a Uniform Resource Locator (URL), and performing the operation based on the information corresponding to the original identification number comprises:
    replacing the short identification number indicated by the URL with the original identification number; and
    linking to relevant information through the replaced URL.

14. The one or more computer readable media of claim 10, wherein generating the short identification number corresponding to the original identification number comprises:
    receiving a request for generating the short identification number; and
    generating the short identification number based on a preset rule.

15. The one or more computer readable media of claim 14, the acts further comprising:
    determining that the generated short identification number exists in stored short identification numbers corresponding to each original identification number; and
    re-generating another short identification number based on the preset rule until when the re-generated short identification number does not exist in the stored short identification numbers corresponding to each original identification number.

16. The one or more computer readable media of claim 14, the acts further comprising:
    determining that the generated short identification number does not exist in stored short identification numbers corresponding to each original identification number; and
    using the generated short identification number as the short identification number corresponding to the original identification number.

17. The one or more computer readable media of claim 14, the acts wherein generating the short identification number based on the preset rule comprises generating the short identification number in a preset value range.

18. The one or more computer readable media of claim 10, wherein the original identification number comprises: a product number, a transaction number, or an order number.

19. A user terminal comprising:
one or more processors;
memory storing executable instructions that, when executed by the one or more processors, cause the one or more processors to perform acts comprising:
sending a request for generating a short identification number corresponding to an original identification number to a server, generating the short identification number corresponding to the original identification number enhancing operation efficiency for processing the original identification number, wherein the short identification number includes fewer digits than the original identification number;
receiving the short identification number from the server, the short identification number having a preset expiration time that is set based at least in part on digits of the short identification number or a frequency of use of the short identification number; and
sending an operation request that includes the short identification number to the server to cause the server to search for the original identification number corresponding to the short identification number, and to perform an operation based on information corresponding to the original identification number.

20. The user terminal of claim 19, wherein the operation request comprises a generation request for generating a Uniform Resource Locator (URL), and the acts further comprise receiving a URL indicating the short identification number from the server.

* * * * *